United States Patent [19]

Witte

[11] Patent Number: 5,132,686
[45] Date of Patent: Jul. 21, 1992

[54] FORWARD LOOKING RADAR

[75] Inventor: Franz Witte, Pürgen, Fed. Rep. of Germany

[73] Assignee: Deutsche Forschungsanstalt fur Luft- und Raumfahrt, Cologne, Fed. Rep. of Germany

[21] Appl. No.: 665,826

[22] Filed: Mar. 7, 1991

[30] Foreign Application Priority Data

Mar. 9, 1990 [DE] Fed. Rep. of Germany ....... 4007611

[51] Int. Cl.$^5$ ............................................. G01S 13/00
[52] U.S. Cl. ..................................................... 342/25
[58] Field of Search ..................... 342/25, 189, 191

[56] References Cited

U.S. PATENT DOCUMENTS 4,675,677 6/1987 von Maydell et al. ............... 342/25

OTHER PUBLICATIONS

DFVLR-FB 85-54, Archimedes Project: "Remote Sensing of Oil Spills North Sea Experiment 1983", Report on DFVLR-SLAR Contribution.
Proceedings of IGARSS'86 Symposium Zuerich, Sep. 8-11, 1986; "Oil Slick Detection with a Sidelooking Airborne Radar".

Primary Examiner—Mark Hellner
Attorney, Agent, or Firm—Browdy and Neimark

[57] ABSTRACT

In a forward looking radar in which from flying or stationary carriers land or marine surfaces in a forward lying sector region are imaged two-dimensionally, an antenna mounted rigidly on a carrier is made up of a plurality of individual elements preferably in the form of horn antennas arranged rectilinearly in a row adjacent each other in such a manner that for a predetermined aperture length l of each individual element and for a predetermined spacing of the individual elements the antenna has an antenna length $L = n \cdot l$. The transmission is incoherent from a single element and thereafter simultaneous reception is effected with the remaining individual elements. To implement a digital coupling of the individual elements each said element is evaluated separately digitally and by correlation of a specific predetermined reference function a digital processing is carried out for each angular region.

3 Claims, 2 Drawing Sheets

FORWARD LOOKING RADAR

BACKGROUND OF THE INVENTION

1. Field of the Invention

The invention relates to a forward looking radar for two-dimensional imaging of land or sea surfaces including objects detectable there in a forward lying sector region of flying or stationary carriers.

2. Description of the Prior Art

In present-day airborn imaging radar systems there is a system-inherent gap in the nadir region because with such systems the overflown terrain or sea can be picked up only to the right and left of the flight path. For a gapless radar imaging of the overflown area however, a sensor is required which with comparable resolution fills out the hitherto missing portion.

In many measuring tasks, for example in measuring marine polution, various sensors would have to be combined with each other. With down looking sensors, for example radiometers, IR scanners, and the like, an aircraft must frequently be exactly guided over an area even with no ground visibility. For this purpose however an imaging radar device is required which is installed in the aircraft and can operate independently of any ground station because radio navigation, depending on the geographical location, is either too inaccurate or not possible at all.

At present no apparatuses are available for the problems outlined above. In flight operations however weather radar systems are used which operate with a socalled "ground mapping mode". These devices have a mechanically scanned antenna so that the geometric and radiometric resolution is system-inherently very low.

The detection gap in the nadir region referred to at the beginning cannot be tilled with the existing systems either. Furthermore, the existing devices, because of their low resolution, cannot even be used as navigation aid. Operational use, for example use in aircraft, is not possible because of the mechanical pivoting of the antennas. Moreover, apart from the mechanical difficulties as regards weight, volume, radome, and the like, the repetition rate is too low.

SUMMARY OF THE INVENTION

The object of the present invention is therefore to provide a forward looking radar with considerably improved resolution and substantially higher repetition rate, avoiding the disadvantages outlined above.

The invention therefore proposes in a forward looking radar for two-dimensional imaging of land or marine surfaces including objects detectable there in a forward lying sector region of flying or stationary carriers, the improvement in which an antenna mounted rigidly on a carrier is made up of a plurality (n) of rectilinearly adjacently disposed individual elements in such a manner that for a predetermined aperture length (l) of each individual element and for a predetermined distance ($\Delta x$ with $\Delta x = 1$) the antenna has an antenna length (L) of $L = n \cdot l$, incoherent transmission is effected by an individual element and thereafter with known phase position of the individual elements with respect to each other simultaneous reception effected with all the other individual elements, to implement a digital coupling of the individual elements each individual element is separately evaluated digitally and a digital processing is carried out by correlation of a specific predetermined reference function ($R(x)$) for each angular region.

Advantageous further developments of the invention are set forth in the subsidiary claim.

According to the invention an antenna is provided which is relatively large but mounted rigidly for example on a flying carrier such as a missile, aircraft, helicopter, or the like, and consists of a plurality of individual elements arranged rectilinearly adjacent each other, and is intended for an incoherent transmitter so that in particular in conjunction with a "side looking" coherent or also incoherent radar system, such as the SAR (Synthetic Aperture Radar) or SLAR (Side Looking Airborne Radar) system technically particularly advantageous possible uses result. The antenna rigidly mounted for example on an aircraft is not an SWG (Slotted Waveguide) antenna or a conventional "phased array antenna" but instead a plurality of individual elements, preferably in the form of horn antennas, are arranged rectilinearly adjacent each other and are then used in such a manner that a processing is possible similar to that with the socalled SAR principle. With the SAR principle by a special acquisition and data processing method a long synthetic antenna is generated to obtain high angular resolution.

Due to this type of data processing it is possible even without an antenna or flight movement, i.e. for example from a stationary carrier such as a tower, ship's mast or the like, to obtain a relatively good resolution, although the latter depends on the antenna length.

With the aid of such a radar sensor constructed according to the invention a land or sea surface is then illuminated in the flight direction in a specific sector and said surface can then be represented as an image on a monitor. For this purpose the processing of the raw data can take place with a real time processor possibly on board of the carrier itself, for example an aircraft. The radar sensor itself can also be used as an independent sensor, for example for a helicopter or also in conjunction with other radar sensors.

BRIEF DESCRIPTION OF THE DRAWINGS

Hereinafter the invention will be described in more detail with the aid of preferred examples of embodiment with reference to the accompanying drawings, wherein.

DESCRIPTION OF THE PREFERRED EMBODIMENTS

Figure 1:
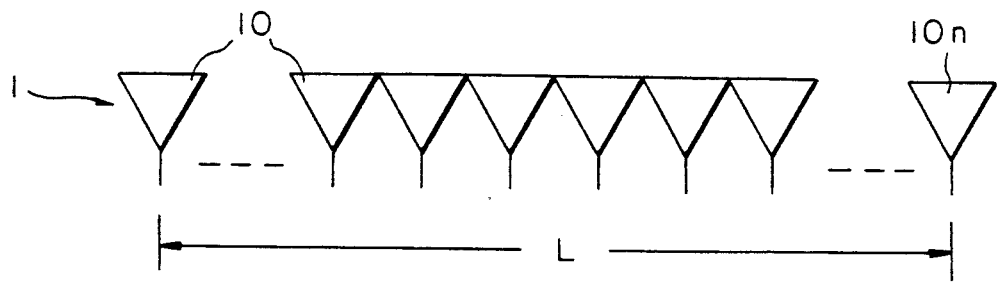
FIG. 1 is a schematic illustration of an antenna according to the invention made up from a plurality of adjacently disposed individual radiators.

In FIG. 1 n individual radiators in the form of horn antennas 10 of an antenna array 1 are arranged schematically rectilinearly adjacent each other and are mounted, in a manner not shown in detail, on an aircraft, shown to a substantially smaller scale, transversely of the flight direction thereof indicated by an arrow in such a manner that the major radiation direction of the horn antennas 10 points into the flight direction.

The transmission here is from only one individual radiator, i.e. from only one horn antenna 10; thereafter, however, reception is effected with all the other individual elements in the form for example of the horn antennas 10. The processing of the raw data can be carried out in a manner similar to the SAR principle outlined above, a synthetic aperture length L being replaced by half the distance between the first and nth individual radiators of the horn antenna array. It should however be remembered that the transmission and reception path are not of equal length.

In the processing the respective signal is correlated in amplitude and phase in dependence upon the range with a conjugatedly complex reference function set forth in detail hereinafter. The decisive point however is that the reception signal has a different phase to the transmission pulse due to the different location between transmitter and receiver. This means that the phase relationship between the individual elements must be constant and known. It is not however necessary for the transmitter to be coherent.

Figure 2:
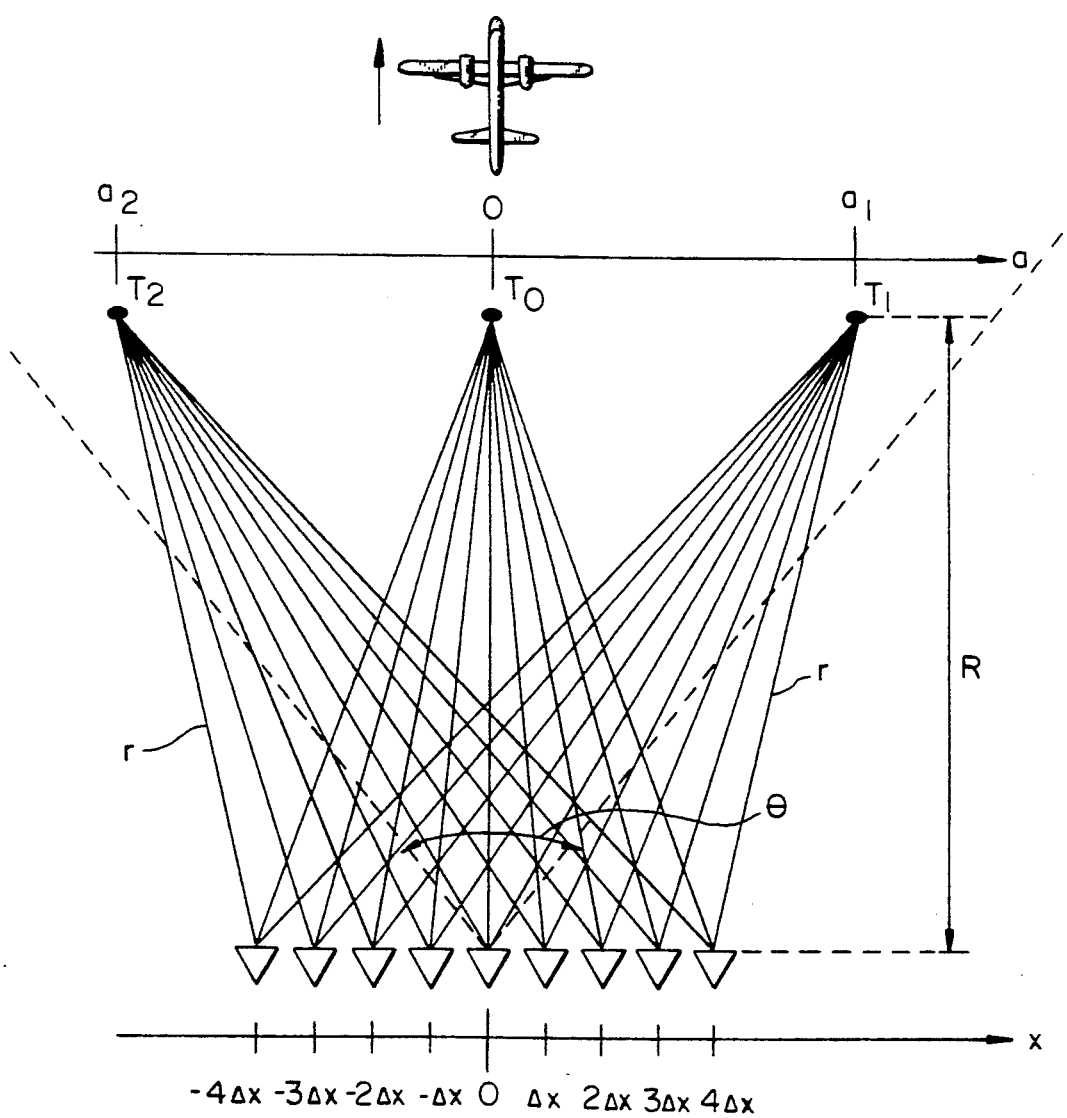
FIG. 2 is a schematic illustration of an illumination geometry as results from an aircraft flying in a predetermined flight direction.

If now the distance between the n individual radiators 10 is in each case $\Delta x$, said spacing can be expressed by:

$$\Delta x = l = \frac{\lambda}{\theta}$$

where $l$ is the aperture length of an individual radiator, $\lambda$ the wavelength and $\theta$ is the illumination angle, said illumination angle $\theta$ being entered in the illumination geometry represented schematically in FIG. 2. If the range between a target point T and an individual radiator 10 of the antenna array is denoted by r, the range r can be expressed as follows, as apparent from the schematic illustration of FIG. 2:

$$r = \sqrt{R^2 + (a-x)^2}$$

where a denotes the distance between the antenna centre axis 0 and a point target T, x the distance between the antenna centre axis 0 and an individual radiator 10 and r the range gate distance as apparent in particular from the schematic illustration of FIG. 2.

The reception signal S can then be represented as a function of the distance x as follows:

$$S(x) = A \cdot e^{j \frac{\pi}{\lambda} \cdot \frac{(a-x)^2}{R}}$$

where A denotes an amplitude of the reception signal S. The already mentioned reference function can then be expressed in dependence upon the distance x as follows:

$$R(x) = e^{-j \frac{\pi}{\lambda} \cdot \frac{(a-x)^2}{R}}$$

However, in a correlation it must be remembered that in the entire illuminated region for each angle a corresponding own reference function must be used.

Thus, the correlation of the reception signal S(x) and the reference function R(x) is as follows:

$$P(k) = \int_{a - L/2}^{a + L/2} S(x) \cdot R(k + x) dx$$

$$P(k) = L \cdot A \cdot e^{j \frac{\pi k^2}{\lambda R}} \cdot \frac{\sin \frac{\pi kL}{\lambda \cdot R}}{\frac{\pi kL}{\lambda \cdot R}}$$

where P denotes the output value of a processor, L the total aperture length between the first and nth individual radiators 10 and k the offset of the reference function R(x) in the correlation, i.e. the offset or misalignment between the individual radiators 10.

This then gives for an angular resolution at the so-called 3 dB points for an angle $\phi$:

$$\phi = 0.866 \cdot \frac{\lambda}{L}$$

Since the correlation for each radar pulse takes place for the entire illuminated region, the pulse repetition frequency (PRF) can be selected as desired. This means that per radar pulse for each angular region an own correlation is carried out with the result that the complete sector can be represented for each radar pulse.

Figure 3:
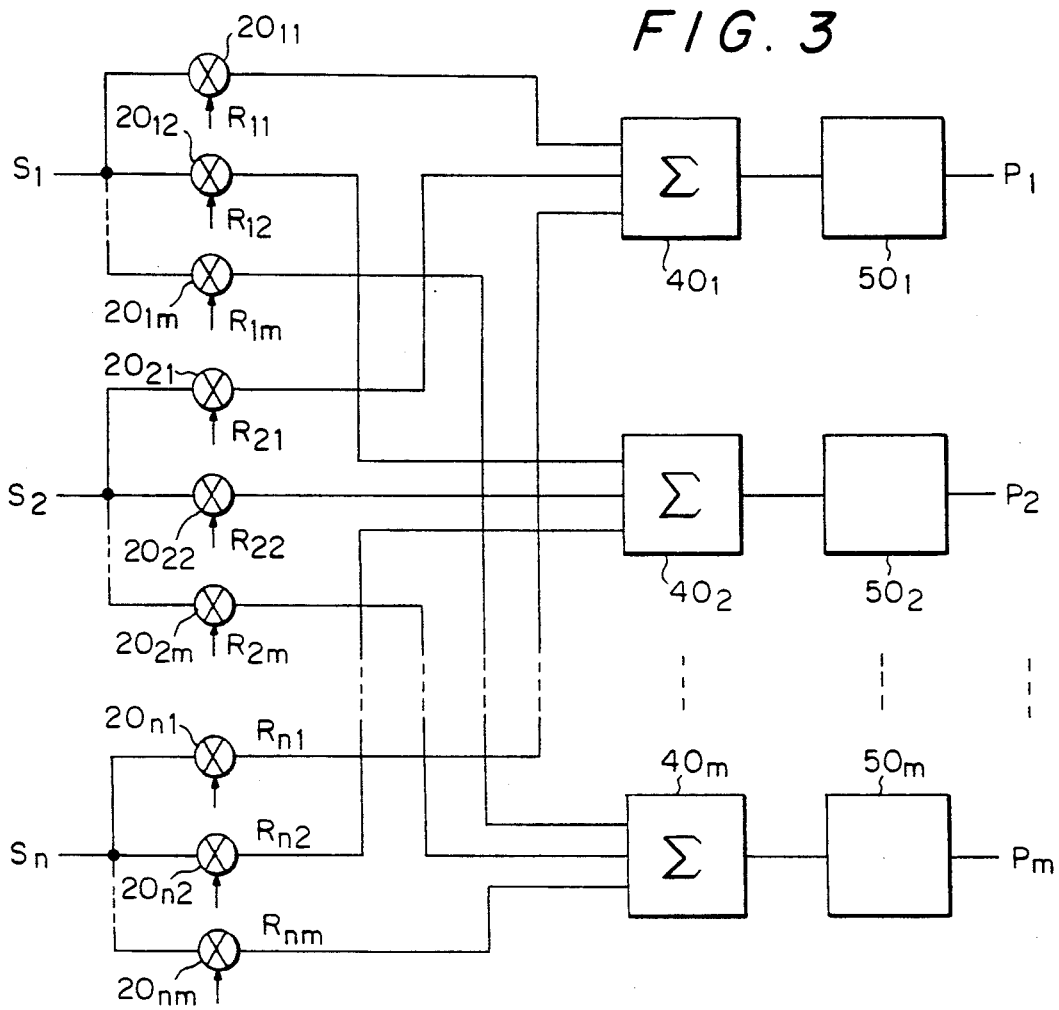
FIG. 3 shows partially in the form of a block diagram a processing scheme for processing raw data and FIG. 4 is a schematic illustration of a block diagram of an imaging forward looking radar according to the invention.

The processing of raw data for a range gate can take place in accordance with the processing scheme illustrated in FIG. 3. Each complex reception signal value $S_u$, where the index u denotes an antenna element assignment for $u = 1$ to n and n denotes the number of individual radiators preferably in the form of horn antennas 10 is applied to respective multiplying members $20_{uv}$, the second index v indicating an assignment of the angle to be resolved for $v = 1$ to m and m denoting the number of angles to be resolved.

In the individual multiplying members $20_{uv}$ the applied complex reception signal $S_u$ is multiplied as regards each individual radiator and the corresponding angle to be resolved by a reference function value $R_{uv}$. The following is true for the reference function value $R_{uv}$:

$$R_{uv} = \cos \phi_{uv} - j \sin \phi_{uv}$$

where for $\phi_{uv}$:

$$\phi_{uv} = \frac{\pi}{\lambda} \frac{\left[\left(v - \frac{m}{2}\right) \cdot \frac{\theta}{m} \cdot R - \left(u - \frac{n}{2}\right) \Delta x\right]^2}{R}$$

wherein $\lambda$ denotes the wavelength, $\theta$ an imaging or illumination angle and R again the range gate distance, $\Delta x$ again denoting the distance between the individual radiators 10.

The output values of the multiplying members $20_{u1}$, $20_{u2}$, ..., $20_{um}$ formed by multiplication, with $u = 1$ to n, are applied to respective associated summation units $40_1, 40_2, \ldots, 40_m$, which are in turn followed by quantity-forming units $50_1, 50_2, \ldots, 50_m$, at the terminals of which in dependence upon the particular angle to be resolved the corresponding picture elements $P_v$ with $v = 1$ to m can be taken off.

To enable the complex reception signal values $S_u$ to be correlated with the corresponding reference function values $R_{uv}$ coherence is necessary only for the individual data set. This requires however that the phase position of the reception elements 10 with respect to each other must be known; the transmitter on the other hand need not be coherent. Consequently, a simple but powerful magnetron transmitter may be used.

Since not only an individual line but in each case an entire sector is to be represented, for each further line corresponding to a different angle another reference function must be used.

The flying speed of a carrier carrying the forward looking radar system according to the invention, for example a airplane or a helicopter, is fundamentally of no significance for the acquisition principle, or in other words the forward looking radar according to the invention is suitable both for a stationary and for a mobile use. In mobile use, i.e. when using a flying carrier, the flying speed can thus be used to improve the result by averaging the individual processed data sets.

The transmission sequence, i.e. the pulse repetition frequency (PRF), is of no significance at all to the forward looking radar according to the invention; it must however be adapted to the particular measuring sequence. Furthermore, the resolution in cross track direction of the measurement carrier depends on the range because according to the invention a fixed antenna length with n individual elements is used. This gives in detail the following values:

| resolution angle ($\phi$) | $0.88 \frac{\lambda}{L}$ |
| --- | --- |
| spacing of individual elements ($\Delta x$) | l |
| number of individual elements (n) | $\frac{L \cdot \theta}{\lambda}$ |
| antenna length (L) | $n \cdot l$ |
| arrangement of the individual elements | 1 row |
| number of reference functions* | $\frac{\theta \cdot L}{2\lambda}$ |
| coherence of the transmitter | none |

Here, the number of the reference functions denoted by a * corresponds to a minimum number considered expedient. Furthermore, the resolution in the along track direction or in the radiating direction depends on the particular pulse length.

After processing the data must generally be corrected geometrically in the range and azimuth directions. For the range correction each point is enlarged with the following factor $F_r$ depending upon the range:

$$F_r = \frac{1}{\cos \alpha}$$

where $\alpha$ is the depression angle, i.e. the angle between the horizontal and the radiating direction. For correction in the azimuth direction each point is enlarged in dependence upon the range with the following factor $F_a$:

$$F_a = \frac{R}{R_1}$$

where R denotes the range of the range gate to be corrected and $R_1$ the range of the first range gate.

To obtain a correct representation of an image, for correcting the particular image the following condition must be additionally fulfilled:

$$\frac{\theta}{m} \cdot R = \frac{\delta_R}{\cos \alpha}$$

where $\delta_R$ is the scanning at the selected range.

Figure 4:
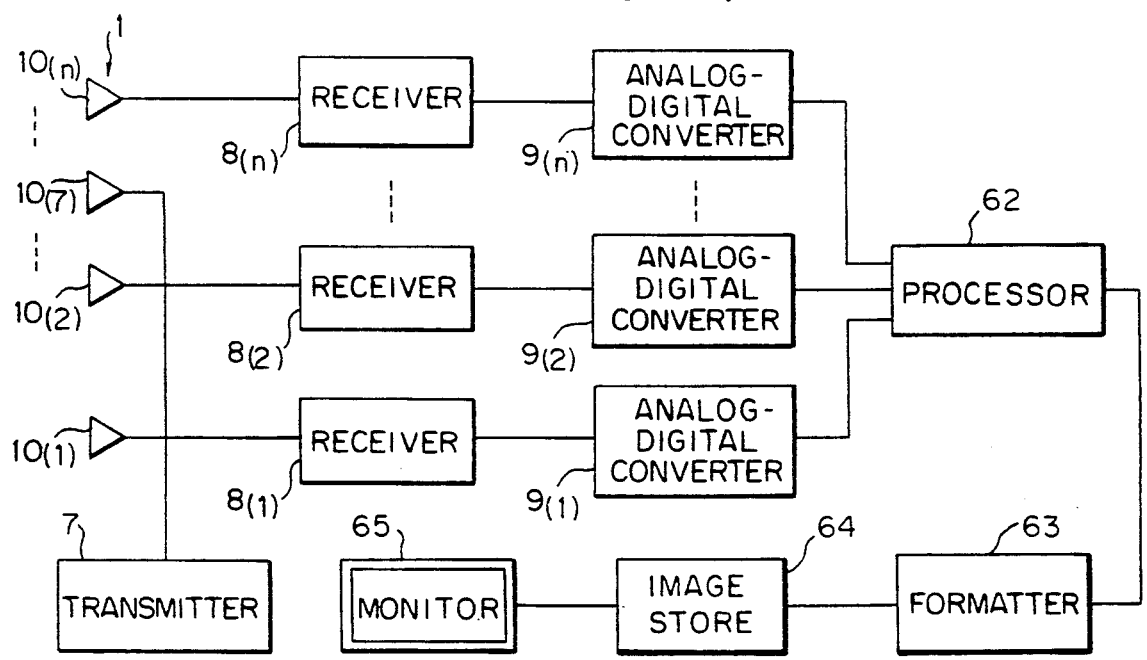

FIG. 4 illustrates a block diagram of an imaging forward looking radar according to the invention. A single individual element, for example the individual radiator $10_{(7)}$ of the antenna 1 having a total of n individual elements 10 is connected to a transmitter 7 and apart from the individual element $10_{(7)}$ all the other individual elements 10 are followed, in each case in series, by a receiver 8 and an analog-digital converter 9. The outputs of the total of (n−1) analog-digital converters 9 are applied to a processor 62, the output values of which are brought via a formatter 63 and an image store 64 to a monitor 65 on which the acquired image data can then be represented.

According to the invention, with a forward looking radar having a rigidly mounted antenna in conjunction with the specific following processing method described above in detail the following advantages can be achieved:

(a) a high pivot speed of the antenna lobe because the latter is not implemented mechanically but electronically with the aid of special data processing;
(b) a high accuracy and thus better quality in the imaging than with the systems hitherto available;
(c) independence from the speed of the carrier, and
(d) considerably reduced maintenance costs.

A further advantage results from the fact that on combination with an existent side looking radar the same transmitter and the same receiver can also be used for the forward looking radar according to the invention.

The forward looking radar according to the invention may also be employed in conjunction with helicopters for search, rescue and environmental tasks because for using the forward looking radar according to the invention no forward speed is necessary and the inherent motion of a helicopter "stationary" at a predefined location is negligible. Another possible use is to employ the forward looking radar according to the invention in conjunction with panorama radar devices such as for example in marine radar or airport radar systems. In such a case however, several antennas must be employed which must be installed in a quite specific geometrical association with each other in accordance with the particular purpose. With panorama radar devices this can for example be achieved by four orthogonally arranged antennas.

In addition, with the forward looking radar according to the invention not only land surfaces may be imaged; the forward looking radar according to the invention may equally well be employed for detection and measuring of marine pollution, for example oil spills and corresponding monomolecular layers.

I claim:

1. A forward looking radar for two-dimensional imaging of land or marine surfaces including objects detectable there in a forward lying sector region of flying or stationary carriers, wherein an antenna (1) mounted rigidly on a carrier is made up of a plurality (n) of rectilinearly adjacently disposed individual elements (10) in such a manner that for a predetermined aperture length (l) of each individual element (10) and for a predetermined distance (Δx with Δx=1) the antenna (1) has an antenna length (L) of L=n·l, whereby incoherent transmission is effected by an individual element (10) and thereafter with known phase position of the individual elements (10) with respect to each other simultaneous reception effected with all the other individual elements (10), to implement a digital coupling of the individual elements each individual element (10) is separately evaluated digitally and a digital processing is carried out by correlation of a specific predetermined reference function (R(x)) for each angular region.

2. A forward looking radar according to claim 1, wherein the plurality (n) of individual elements (10) are configured as horn antennas and arranged in one row rectilinearly adjacent each other.

3. A forward looking radar for two-dimensional imaging of land or marine surfaces including objects detectable in a forward lying sector region of flying or stationary carriers, comprising an antenna (1) mounted rigidly on a carrier formed of a plurality (n) of rectilinearly adjacently disposed individual elements (10) in such a manner that for a predetermined aperture length (l) of each individual element (10) and for a predetermined distance (Δx with Δx=1), the antenna (1) has an antenna length (L) of L=n·l, means for effecting incoherent transmission by an individual element (10) and thereafter with known phase position of said individual elements (10) with respect to each other to effect simultaneous reception with all said individual elements (1), means for separately digitally evaluating each individual element (10) to implement a digital coupling of said individual elements, and means for correlating a specific predetermined reference function (R(x)) for each angular region to effect digital processing.

* * * * *